Figure 1:
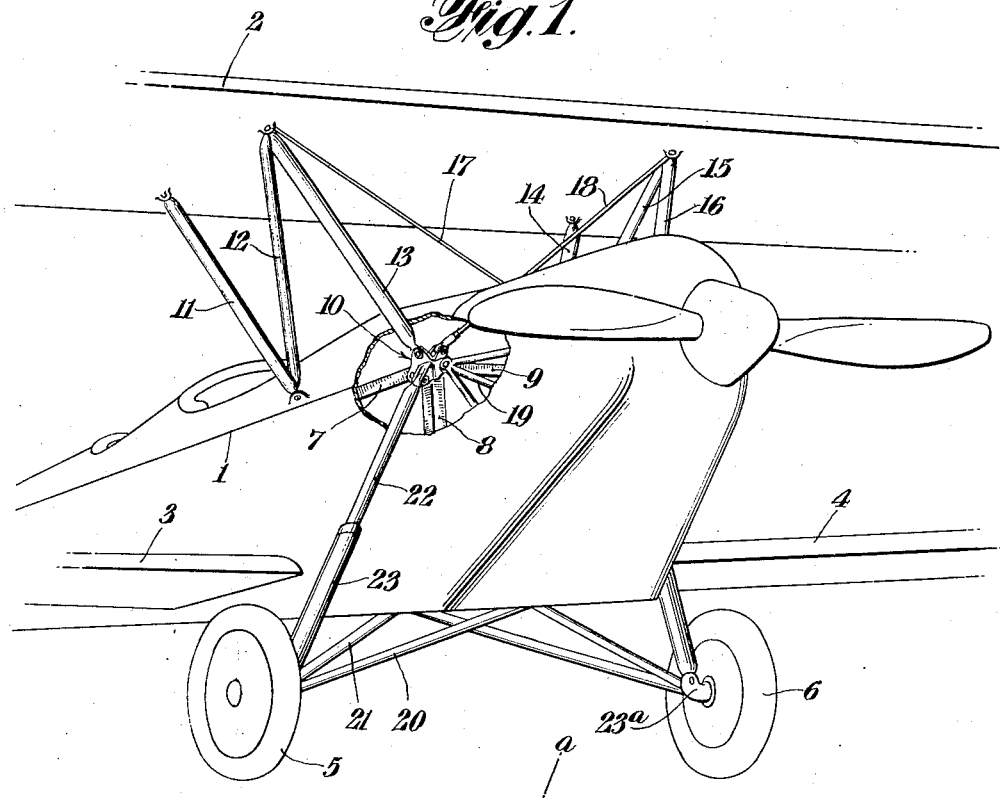

Sept. 2, 1930. C. H. DAY ET AL 1,774,593
AIRPLANE
Filed Nov. 29, 1929 2 Sheets-Sheet 1

INVENTORS
Charles H. Day
Rostislaw Komarnitsky
BY
Ward Crosby & Neal
their ATTORNEYS Sept. 2, 1930.  C. H. DAY ET AL  1,774,593
AIRPLANE
Filed Nov. 29, 1929  2 Sheets-Sheet 2
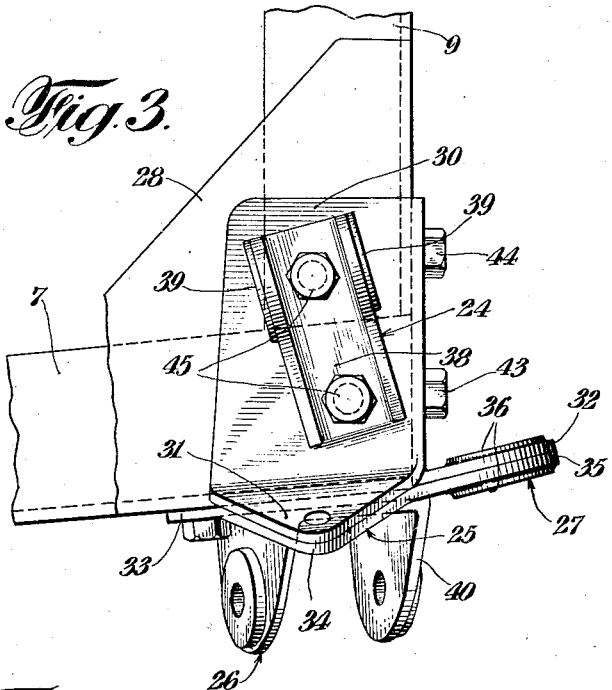
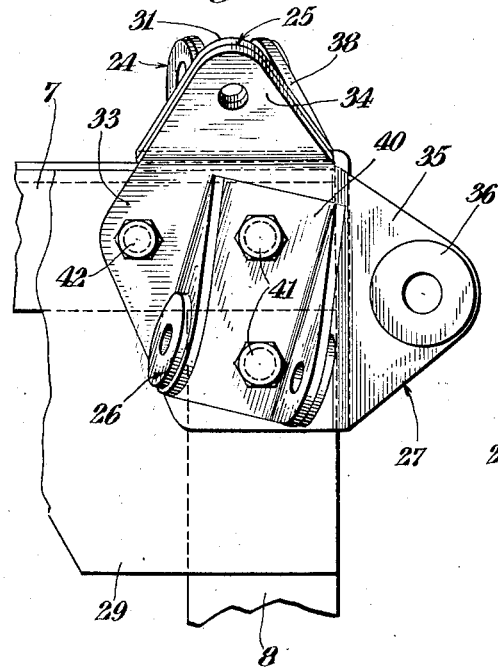
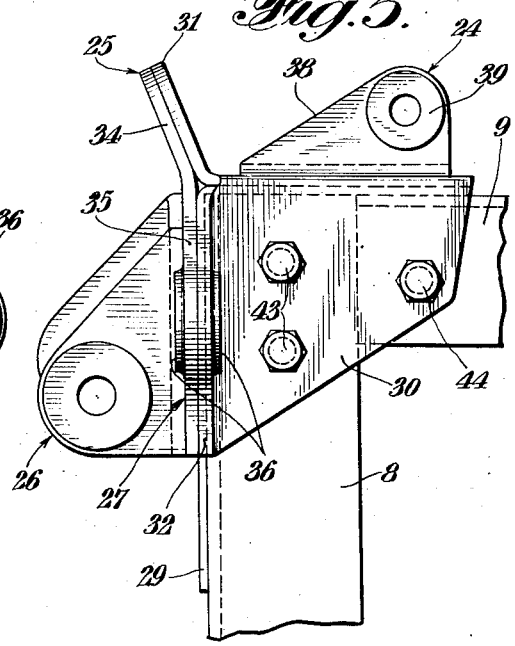
INVENTORS
Charles H. Day.
Rostislav Komarnitsky
BY
Ward Crosby & Neal
their ATTORNEYS Patented Sept. 2, 1930

1,774,593

UNITED STATES PATENT OFFICE

CHARLES H. DAY, OF RIDGEWOOD, AND ROSTISLAW KOMARNITSKY, OF PATERSON, NEW JERSEY, ASSIGNORS TO NEW STANDARD AIRCRAFT CORPORATION, OF PATERSON, NEW JERSEY, A CORPORATION OF NEW JERSEY

AIRPLANE

Application filed November 29, 1929. Serial No. 410,333.

This invention relates to airplanes and structural features thereof.

An object of the invention is to provide an efficient arrangement and disposition of stress carrying parts and interconnecting means therefor.

Further and more specific objects, features and advantages will more clearly appear from the detailed description given below taken in connection with the accompanying drawings which form a part of this specification.

The invention consists in the novel features, arrangements and combination of parts embodied by way of example, in the apparatus hereinafter described, as illustrating a preferred form of the invention, and the invention will be more particularly pointed out in the appended claims.

Referring to the drawings—

Figure 2:
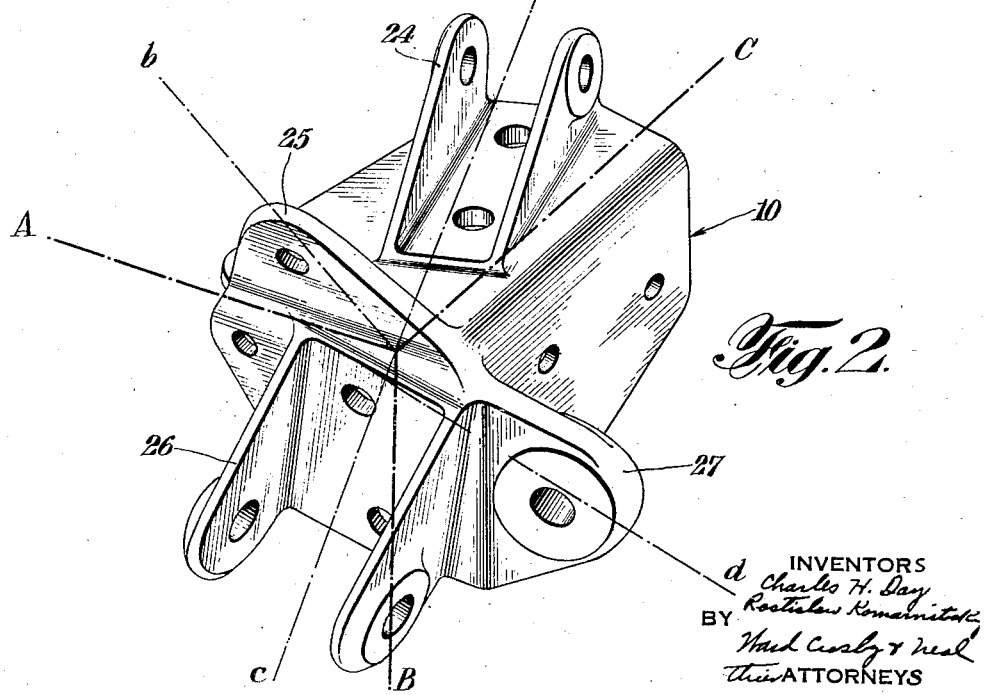

Fig. 1 illustrates a front view of an airplane in perspective, with certain parts omitted and with a portion broken away to more clearly illustrate certain features of the invention, Fig. 2 is a perspective view of a fitting shown in Fig. 1, Fig. 3 is a plan view of the fitting shown in Fig. 2 and certain related parts of the airplane structure, Fig. 4 is a side elevation of the same, and Fig. 5 is a front elevation of the same.

Referring more particularly to Figs. 1 and 2 of the drawings, the airplane fuselage is represented in general as 1, the upper wing as 2, and the lower wing panels as 3 and 4, respectively. The landing gear wheels are designated as 5 and 6, respectively. The fuselage per se will not be described in detail, since this is clearly illustrated and described in our copending application Ser. No. 408,977, filed November 22, 1929; and therefore only such details of the fuselage will be referred to as are necessary for a clear understanding of the present invention. The upper left hand longéron is designated as 7, the forward vertical strut as 8 and the forward upper horizontal strut as 9. The struts 7, 8 and 9 are rigidly connected together to form the upper corner of the fuselage framework. The members 7, 8 and 9 therefore comprise fuselage stress carrying members, as will be well understood by those skilled in the art. The corresponding right hand corner of the fuselage is similarly formed, and therefore is not shown in the drawings.

The fuselage corner fitting 10, to be more particularly described following, is rigidly attached to the corner of the fuselage. The upper wing 2 is attached to the fuselage by means comprising the cabane struts 11, 12 and 13 and the respectively corresponding struts 14, 15 and 16. The cabane section is transversely braced by the truss wires 17 and 18. The wing truss members such as 13 and 18 are attached to the fuselage by means of the fitting 10. The engine (not shown) is supported by suitable truss means including the truss member 19 which is also attached to the fitting 10. The landing wheels 5 and 6 are attached to the fuselage by suitable truss means such for example as by the struts 20, 21 and 22 connected together at their lower end by suitable means such as 23ª which serves as a spindle for wheels such as 6. The struts such as 20 and 21 are attached to the fuselage at their opposite ends and the strut 22 is attached at its upper end to the fitting 10. In the present embodiment, the strut 22 is telescopically formed and suitable shock absorbing means is provided within the outer member such as 23.

Referring more particularly to Fig. 2, the neutral axes of the members 7, 8 and 9 are represented respectively by the dot and dash lines A, B and C; and the neutral axes of the truss members such as 18, 13, 22 and 19 are indicated respectively by the lighter dot and dash lines designated as $a$, $b$, $c$ and $d$. Means for attaching the wire 18 is designated as 24, means for attaching the strut 13 is designated as 25, means for attaching the landing gear strut 22 is designated as 26, and means for attaching the engine support member 19 is designated as 27.

It will be seen from referring to Figs. 1 and 2 that the truss members 18, 13, 22 and 19 are so arranged and disposed that their neutral axes $a$, $b$, $c$ and $d$ as indicated in Fig. 2, converge to a substantially common point, and that this point substantially coincides with the neutral axes of the fuselage members A, B and C. It will therefore be apparent that the point at which these various neutral axes substantially coincide falls within the confines of the fitting 10. Furthermore, it will be seen that as to all of the neutral axes with the exception of $d$, these preferably exactly coincide (Fig. 2) and this point of coincidence falls within the corner of the fuselage as defined by the contiguous area of the fitting 10.

By so designing the airplane that the chief load carrying or stress members have their neutral axes intersecting at substantially a common point, the greatly undesirable feature of eccentricity of stresses is therefore eliminated. Furthermore, by properly arranging and positioning the stress carrying members, and by making special provision in the fitting for attaching the same to the fuselage, the point at which these stresses coincide, or the point at which the neutral axes of these members come together, is located at substantially the point of intersection of the neutral axes of the main stress carrying members of the fuselage adjacent where this fitting is attached. Accordingly, it will be appreciated that by such a structure the actual and theoretical structural efficiency of an airplane is greatly increased.

Referring more particularly to Figs. 3, 4 and 5, the longéron 7, the forward vertical strut 8 and upper horizontal strut 9 are shown in the form of L sections, in the present embodiment formed of duralumin. These three stress carrying members of the fuselage terminate at the corner and are preferably suitably braced by gusset plates 28 and 29; the gusset plates and angle section members being rigidly secured together by suitable means (not shown). The fitting, which is designated in its entirety as 10 in Fig. 1, is preferably formed in the following manner.

The member 30 is formed of sheet metal and is bent in angular form, as indicated in Fig 5, and formed integral with the angular flanges thereof are lugs 31 and 32. A second member 33 is also formed of sheet metal and is provided with lugs 34 and 35 formed integral therewith. The lugs 31, 32, 34 and 35 are bent to the extent and in the directions indicated in the drawings and the member 33 is attached integrally to the member 30 with the lugs 31 and 34 and the lugs 32 and 35 in respective register; and the members 30 and 33 are integrally attached together by suitable means such as by welding. The cooperating lugs 31 and 34 provide the attachment lug 25 for the cabane strut such as 13, and the cooperating lugs 32 and 35 together form the attachment lug 27 for the motor support member 19. Reinforcing washers such as 36 are preferably secured to the opposite faces of the motor support lug for the purpose of increasing the bearing area for the pin or bolt serving to attach the motor support member 19 thereto. A member 38 made of sheet metal and bent in U form is attached to the top of the member 30, as by welding, with the lower face of the U contiguous to the upper face of the member. The upwardly projecting side walls of the U member 38 are preferably reinforced by washers 39 which are attached thereto such as by welding and the sides of the U so reinforced are provided with aligned holes to accommodate a clevis pin for attaching the transverse wire 18. A second U shaped member 40 formed similarly to the member 38 is attached to the outside face of the member 33, as by welding, and is similarly provided with transverse bores through the reinforced sides for accommodating the pin or bolt serving to attach the landing gear strut 22 thereto. The fitting so constructed actually appears in its completed form as indicated in Fig. 2 where the welding has somewhat obliterated the lines shown in Figs. 3, 4 and 5 as representing the juncture points between the separate pieces of metal, such lines having been shown in Figs. 3, 4 and 5 to more clearly indicate the preferred form of constructing this fitting. The fitting when it is completed provides what might be termed a cap fitting for the corner of the fuselage.

The fitting is attached to the corner of the fuselage by suitable means such for example as the bolts 41 which pass through the bottom of the U 40, the member 33 and the longéron 7 and strut 8; also by the bolt 42 which passes through the longéron 7. The fitting is further attached on its front face by means such as the bolts 43 which pass through the member 30 and the vertical strut 8, and the bolt 44 which passes through the member 30 and the horizontal strut 9. The top side of the fitting is attached by means such as the bolts 45 which pass through the U 38, the member 30 and the longéron 7 and horizontal strut 9. It will be obvious of course that the bolts on the side and top of the fitting also pass through the gusset plates 28 and 29.

It will therefore be seen that the fitting provides a reinforcing cap for the corner of the fuselage serving to additionally secure the fuselage struts 7, 8 and 9 together and serving to interconnect the corner of the fuselage with the wing and landing gear and engine truss members.

Having thus described our invention with particularity with reference to its preferred form, it will be obvious to those skilled in the art, after understanding our invention, that various changes and modifications may be made therein without departing from the spirit and scope of our invention, and we aim in the appended claims to cover such changes and modifications as are within the scope of the invention.

What we claim is:

1. In an airplane the combination of a fuselage, wing truss means, landing gear truss means, engine truss means, and a unitary fitting interconnecting said wing and landing gear and engine truss means to and attaching them at an upper corner of said fuselage.

2. In an airplane the combination of a fuselage having a plurality of stress carrying members terminating at an upper corner of said fuselage, wing truss means, landing gear truss means, engine truss means, and a fitting attached to said fuselage stress carrying members and serving as a common means interconnecting said wing and landing gear and engine truss means to said upper corner of said fuselage.

3. In an airplane the combination of a fuselage having a plurality of stress carrying members connected at and forming an upper corner of said fuselage, wing truss means, landing gear truss means, engine truss means, and fitting means interconnecting said wing and landing gear and engine truss means to and attaching them at said upper corner of said fuselage.

4. In an airplane the combination of a fuselage having a plurality of stress carrying members terminating at an upper corner of said fuselage, wing truss members, a landing gear truss member, an engine truss member, and a unitary fitting interconnecting said wing truss members, said landing gear truss member and said engine truss member to and attaching them at said upper corner of said fuselage, said members being so disposed and said fitting so constructed that the neutral axes of said fuselage stress carrying members and the neutral axes of said wing and landing gear truss members converge at substantially the same point.

5. In an airplane the combination of a fuselage having a plurality of stress carrying members terminating at an upper corner of said fuselage, wing truss members, a landing gear truss member, an engine truss member, and a unitary fitting interconnecting said wing truss members, said landing gear truss member and said engine truss member to and attaching them at said upper corner of said fuselage, said members being so disposed and said fitting so constructed that the neutral axes of said fuselage stress carrying members and the neutral axes of said wing and landing gear truss members converge within the confines of said fuselage corner as defined by the contiguous area of said fitting.

6. An airplane fuselage corner fitting in the form of a corner cap having three sides homologous to and corresponding respectively to the three sides of said fuselage at the corner thereof, means carried by one of said sides for attaching a wing truss member, means carried by another of said sides for attaching a landing gear truss member, means adjacent the juncture of two of said sides for attaching a second wing truss member, and means adjacent the juncture of one of said last mentioned sides and said third side for attaching a motor truss member.

7. An airplane fuselage corner fitting in the form of a corner cap having three sides homologous to and corresponding respectively to the three sides of said fuselage at the corner thereof, said sides furnishing means for attaching said fitting to said fuselage corner and for reinforcing said corner, means carried by one of said sides for attaching a wing truss member, means carried by another of said sides for attaching a landing gear truss member, means adjacent the juncture of two of said sides for attaching a second wing truss member, and means adjacent the juncture of one of said last mentioned sides and said third side for attaching a motor truss member.

8. An airplane fuselage corner fitting in the form of a corner cap having three sides homologous to and corresponding respectively to the three sides of said fuselage at the corner thereof, means carried by one of said sides for attaching a wing truss member, means carried by another of said sides for attaching a landing gear truss member, means adjacent the juncture of two of said sides for attaching a second wing truss member, and means adjacent the juncture of one of said last mentioned sides and said third side for attaching a motor truss member, said attachment means being so formed individually and so positioned relatively that their neutral axes will converge inwardly to substantially a common point.

9. An airplane fitting of the character described comprising a first member of angular cross section and having a first lug and a second lug integral respectively with the sides thereof, a second member having a first lug and a second lug formed integral therewith, said second member being integrally connected across the end of said first member to form a corner cap with said first lugs cooperating to provide a first lug attaching means and with said second lugs cooperating to provide a second lug attaching means, third attaching means carried by said first member and fourth attaching means carried by said second member.

10. An airplane fitting of the character described comprising a first member of angular cross section and having a first lug and a second lug integral respectively with the sides thereof, a second member having a first lug and a second lug formed integral therewith, said second member being integrally connected across the end of said first member to form a corner cap with said first lugs cooperating to provide a first lug attaching means and with said second lugs cooperating to provide a second lug attaching means, a third member of U shape having its bottom face integrally attached to a contiguous face of said first member and its sides forming attaching means, and a fourth member of U shape having its bottom face integrally attached to a contiguous face of said second member and its sides forming attaching means.

11. An airplane fitting of the character described comprising a first member of sheet material and of angular cross section and having a first lug and a second lug integral respectively with the sides thereof, a second member of sheet material having a first lug and a second lug formed integral therewith, said second member being integrally connected across the end of said first member to form a corner cap with said first lugs cooperating to provide a first lug attaching means and with said second lugs cooperating to provide a second lug attaching means, a third sheet metal member of U shape having its bottom face integrally attached to a contiguous face of said first member and its sides forming attaching means, and a fourth sheet metal member of U shape having its bottom face integrally attached to a contiguous face of said second member and its sides forming attaching means.

In testimony whereof we have signed our names to this specification.

CHARLES H. DAY.
ROSTISLAW KOMARNITSKY.